(12) United States Patent
Obrist et al.

(10) Patent No.: US 11,598,257 B2
(45) Date of Patent: Mar. 7, 2023

(54) HUB-HUB CONNECTION FOR A POWER UNIT

(71) Applicant: OBRIST TECHNOLOGIES GMBH, Lustenau (AT)

(72) Inventors: Frank Obrist, Bregenz (AT); Oliver Obrist, Lustenau (AT)

(73) Assignee: Obrist Technologies GmbH, Lustenau (AT)

( * ) Notice: Subject to any disclaimer, the term of this patent is extended or adjusted under 35 U.S.C. 154(b) by 0 days.

(21) Appl. No.: 17/285,541

(22) PCT Filed: Oct. 9, 2019

(86) PCT No.: PCT/EP2019/077358
§ 371 (c)(1),
(2) Date: Apr. 15, 2021

(87) PCT Pub. No.: WO2020/079796
PCT Pub. Date: Apr. 23, 2020

(65) Prior Publication Data
US 2021/0381426 A1    Dec. 9, 2021

(30) Foreign Application Priority Data

Oct. 18, 2018    (DE) .......................... 102018125874.7

(51) Int. Cl.
*F02B 75/06* (2006.01)
*B60K 6/24* (2007.10)
(Continued)

(52) U.S. Cl.
CPC .............. *F02B 75/065* (2013.01); *B60K 6/24* (2013.01); *B60K 6/485* (2013.01); *F02B 63/042* (2013.01); *F02B 2075/1808* (2013.01)

(58) Field of Classification Search
CPC .. B60K 6/24; B60K 6/485; B60K 2006/4833; B60K 6/46; F02B 2075/1808;
(Continued)

(56) References Cited

U.S. PATENT DOCUMENTS 4,856,639 A * 8/1989 Fukushima ......... F16F 15/1207
192/55.61
7,318,403 B1    1/2008 Huart et al.
(Continued)

FOREIGN PATENT DOCUMENTS

CN            2775318 Y      4/2006
CN         101175928 A  *   5/2008  ............. F16D 13/56
(Continued)

OTHER PUBLICATIONS

DE 102008017029 A1 English Translation (Year: 2009).*
(Continued)

*Primary Examiner* — George C Jin
*Assistant Examiner* — Teuta B Holbrook
(74) *Attorney, Agent, or Firm* — Cesari and McKenna, LLP (57) ABSTRACT

The invention relates to a power unit, in particular for a hybrid vehicle, including a reciprocating-piston engine and at least one generator drivingly connected to the engine, wherein the engine has at least two pistons guided in at least two cylinders in a tandem arrangement, and two crankshafts, which are connected to the pistons by connection rods that run in opposite directions, and are mechanically coupled in the same phase. The engine includes a hub-hub connection with a first connection joining a first hub to a second hub such that an angular position between the first hub and the second hub is continuously adjustable on installation. The hub-hub connection also has a second connection in the form of a connection disk configured, dimensioned and
(Continued)

arranged with support surfaces, on each of which the first hub and the second hub rest. The connection disk has a matrix with hard material elements embedded therein, in particular diamond chips, which are arranged in the support surfaces for frictional engagement of the hubs.

19 Claims, 5 Drawing Sheets

(51) Int. Cl.
  *B60K 6/485* (2007.10)
  *F02B 63/04* (2006.01)
  *F02B 75/18* (2006.01)
(58) Field of Classification Search
  CPC ...... F02B 63/042; F02B 75/065; F02B 75/20; F16D 2200/0047; F16D 2200/0052; F16D 69/00; F16D 69/023; F16H 55/34; Y02T 10/62
  See application file for complete search history.

(56) References Cited

U.S. PATENT DOCUMENTS

| | | | | |
|---|---|---|---|---|
| 2009/0107426 | A1* | 4/2009 | Berger | B60K 6/24 903/902 |
| 2013/0199463 | A1* | 8/2013 | Pischinger | B60L 50/62 123/2 |
| 2013/0319349 | A1* | 12/2013 | Obrist | B60K 6/24 123/2 |
| 2017/0009649 | A1* | 1/2017 | Gurney | F01B 1/10 |
| 2017/0226925 | A1* | 8/2017 | Laimboeck | B60K 6/24 |

FOREIGN PATENT DOCUMENTS

| | | | | | |
|---|---|---|---|---|---|
| CN | 201367943 | Y | * | 12/2009 | ............ B60K 6/24 |
| CN | 202867596 | U | * | 4/2013 | |
| CN | 107107728 | A | | 5/2019 | |
| DE | 10212033 | B3 | * | 1/2004 | ............ B60K 6/26 |
| DE | 102008017029 | A1 | * | 10/2009 | ............ C23C 24/04 |
| DE | 102008049106 | A1 | * | 4/2010 | ............ F01L 1/344 |
| DE | 102014115042 | A1 | | 4/2016 | |
| EP | 1136721 | A2 | * | 9/2001 | ............ F02B 75/20 |
| EP | 1783391 | A1 | * | 5/2007 | ............ F16D 13/70 |
| EP | 2075466 | A1 | * | 7/2009 | ............ F03D 15/00 |
| EP | 2381086 | A1 | * | 10/2011 | ............ F02N 15/025 |
| WO | WO-8802451 | A1 | * | 4/1988 | |
| WO | WO-2012/056275 | A1 | | 5/2012 | |
| WO | WO-2012056275 | A1 | | 5/2012 | |
| WO | WO-2016034783 | A1 | | 3/2016 | |

OTHER PUBLICATIONS

PCT Notification of Transmittal of the International Search Report and the Written Opinion of the International Searching Authority, or the Declaration, International Searching Authority, International Application No. PCT/US2019/077358, dated Jan. 28, 2020, 21 pages.

PCT Notification of Transmittal of Translation of the International Preliminary Report on Patentability, International Application No. PCT/EP2019/077358, dated Apr. 29, 2021, 8 pages.

CN (application No. 201980068089.6) examination report dated Feb. 28, 2022, 9 pages.

\* cited by examiner

HUB-HUB CONNECTION FOR A POWER UNIT

CROSS REFERENCE TO RELATED APPLICATIONS

This application is the National Stage of International Application No. PCT/EP2019/077358, filed Oct. 9, 2019, which claims the benefit of German Patent Application No. 102018125874.7 filed on Oct. 18, 2018. The contents of both applications are hereby incorporated by reference in their entirety.

The invention relates to a power unit, in particular for a hybrid vehicle, comprising a reciprocating-piston engine and at least one generator which is drivingly connected to said engine, according to the preamble of claim 1. The invention further relates to a vehicle, in particular a hybrid vehicle, comprising a power unit according to the invention.

The publication WO 2012/056 275 A1 discloses a machine combination comprising an internal combustion engine and a generator for the charging of a battery of a hybrid drive. The known internal combustion engine has two cylinder-piston units, arranged parallel to one another, wherein the pistons in the cylinders are in driving connection with respectively a crankshaft by means of connection rods. A generator is driven by means of a gear by one of the crankshafts. For this, spur gears can be arranged which connect both crankshafts with one another. One of these spur gears can be in drive connection directly or by means of an intermediate gear with a spur gear which is fastened to the rotor shaft of the generator.

It is known to produce a connection between crankshaft and gearwheel mechanism for example by means of an outer or inner toothing of the crankshaft. Such a connection is cost-intensive. Toothings generally mean higher production costs and a laborious production method. In addition, a rapid mechanical wear can occur in the case of a dynamic load.

Alternatively, it is known from practice to produce a connection between a crankshaft and a gear by means of cone connections. Cone connections comprise for example cone clamping elements or double cone clamping sets. Through the use of such clamping elements, which take up space, attention must be paid to a sufficient wall thickness of the gear which is to be connected. Accordingly, no flexible configuration of the gear is provided.

The invention is therefore based on the problem of improving a power unit of the type of construction named in the introduction so that a simple, favourably priced and secure connection is produced between the crankshaft and the gearwheel mechanism, generally between two hubs. The invention is further based on the problem of indicating a vehicle comprising such a power unit.

This problem is solved according to the invention by a power unit having the features of claim 1 and by a vehicle having the features of claim 12.

In practice, the problem is solved by a power unit, in particular for a hybrid vehicle, comprising a reciprocating-piston engine and at least one generator which is drivingly connected to said engine, wherein the reciprocating-piston engine has at least two pistons which are guided in at least two cylinders in tandem arrangement, and two crankshafts, which are connected to the pistons by means of connection rods, run in opposite directions, and are mechanically coupled in the same phase. The reciprocating-piston engine comprises a hub-hub connection with a first connection means which connects a first hub and a second hub, wherein the angular position between the first hub and the second hub is continuously adjustable on installation. The hub-hub connection has a second connection means in the form of a connection disc with support surfaces, on each of which the first hub and the second hub rest. The second connection means additionally has a matrix with hard material elements embedded therein, in particular diamond chips, which are arranged in the support surfaces.

In a preferred embodiment of the invention, the first hub comprises a crankshaft and the second hub an output hub. Advantageously, the output hub can be formed by a sprocket or a belt wheel.

It is generally conceivable that the first hub comprises a crankshaft and the second hub comprises a drive hub.

Similarly to the output hub, the drive hub can be formed by a sprocket or a belt wheel.

It is furthermore generally conceivable that the first hub comprises a generator shaft. It is pointed out that the invention is not limited here to the named components. Alternatively, any, in particular rotating, component of the reciprocating-piston engine can be equipped with the hub-hub connection according to the invention. For example, the hub-hub connection can be formed between a camshaft and a sprocket.

The hub-hub connection according to the invention has a first connection means. The first connection means can comprise a screw which is screwed with an inner thread of the first hub. For example, the sprocket can be screwed with the crankshaft and connected therewith in a force-fitting manner.

Alternatively, the first connection means can comprise a hub nut which is screwed with an external thread of the first hub.

The use of a screw as first connection means of the hub-hub connection according to the invention constitutes a simple connection form. This facilitates the repair in the case of damage which is present, and the installing and dismantling of the connection. Low production and installation costs consequently result. Through the screw connection, for example a toothing of the crankshaft can be dispensed with, which in turn reduces the production costs of the power unit.

The hub-hub connection according to the invention has a second connection means. The second connection means is embodied in the form of a connection disc with support surfaces, on which the first hub and the second hub respectively rest. The use of a connection disc enables a space-saving, frictionally engaged connection between the hubs. In this respect, the connection disc is preferably formed for the frictionally engaged connection of the hubs, in particular of the crankshaft and of the sprocket with one another.

It is particularly advantageous that the connection disc has a matrix with hard material elements for increasing the friction between two components. Here, these can be components which are clamped together, which are preferably screwed and connected with one another in a force-fitting manner. For example, this can concern the clamping between sprocket and crankshaft. The connection disc having a matrix with hard material elements embedded therein additionally increases the static friction between the screwed crankshaft with the sprocket. A secure connection is thus provided between crankshaft and sprocket.

Ideally, the connection disc has a matrix with diamond chips embedded therein. Thereby, a micro form fit is produced. It has been found that the friction values between sprocket and crankshaft are thus increased two- to fourfold. Through an increase of the friction values, the connection disc according to the invention brings about an efficient torque transmission between crankshaft and sprocket. This, in turn, provides for an efficient motor control, in particular for a hybrid vehicle, and thereby for a low fuel consumption.

A further advantage of the hub-hub connection according to the invention is that the angular position between the first hub and the second hub is continuously adjustable on installation. A continuously definable adjustment, for example of the crankshaft, brings about an improvement to the efficiency of the reciprocating-piston engine. When the initial angular position of the crankshaft is continuously adjustable, the starting process of the reciprocating-piston engine and thus also of the hybrid vehicle can be accelerated considerably, and thus also the pollutant emission can be reduced. The simply configured hub-hub connection facilitates both the adjusting of the angular position between crankshaft and sprocket and also the adjusting of the angular position between crankshaft and generator.

In a preferred embodiment, the first connection means, in particular the screw, extends through the second connection means. For example, the sprocket can have a central screw for fastening on the crankshaft. The connection disc can be arranged between the gear and the crankshaft. Here, the screw extends for fastening centrally through the connection disc. The invention is not restricted here to a single screw. It is conceivable that the connection disc has several openings, so that several screws can extend through the connection disc. Advantageously, the first, in particular the single first connection means, extends centrally through the second connection means. This provides for a stable fastening.

In a preferred embodiment, the first connection means, in particular the screw, exerts a pressure force, acting in longitudinal direction, onto the second connection means. Here, for example, the screw for fastening the sprocket with the crankshaft can exert a pressure force onto the connection disc between sprocket and crankshaft. This additionally intensifies the frictional engagement of the connection disc. Therefore, a secure and stable connection is provided between sprocket and crankshaft.

Ideally, the first connection means, in particular the screw, is screwed with the drive hub in such a way that the torque transmission is directed against the tightening direction of the first connection means. This prevents the screw from detaching during the starting of the reciprocating-piston engine.

In a preferred embodiment of the invention, the first hub and the second hub form parallel face surfaces which rest on the support surfaces of the second connection means. For example, the coated connection disc can be arranged directly between crankshaft and sprocket. A face surface of the sprocket is aligned here in a parallel manner to a face surface of the crankshaft. The right-side and left-side support surface of the connection disc stands respectively in direct contact with the face surface of the sprocket and the face surface of the crankshaft.

The greater the support surface between connection disc and crankshaft and sprocket, the more efficient are the frictional engagement between the components and the torque transmission between sprocket and crankshaft. This also implies that advantageously the connection disc can have on both sides a matrix with embedded hard material elements.

In a further preferred embodiment, at least one generator can be connected with a crankshaft by a gearwheel mechanism or by a traction means. Ideally, this embodiment enables a low-noise operation of the power unit for a hybrid vehicle.

The traction means can comprise for example a chain or a toothed chain or a toothed belt. Advantageously, a first traction means connects the first generator with the first crankshaft and a second traction means connects the second generator with the second crankshaft. The traction means can be embodied here in relatively short and thus space-saving manner.

In a further preferred embodiment there can be a power unit, which comprises the at least one generator, which is rotatable in the same direction with respect to the first crankshaft and in the opposite direction to the second crankshaft, and a balance shaft which is rotatable in the same direction with respect to the second crankshaft and in the opposite direction to the first crankshaft. The generator is drivingly connected here by means of a first traction means or a first gearwheel mechanism directly with the first crankshaft, wherein the balance shaft is drivingly connected by means of a second traction means directly with the second crankshaft. The balance shaft and/or the second crankshaft carry a flywheel mass element.

The invention is based on the idea of replacing a second generator, as is provided for example in the prior art according to DE 10 2014 115 042 A1, by a flywheel mass element on the balance shaft and/or on the second crankshaft. Through the flywheel mass element the quiet running is achieved which the known power unit also has. Thus the power reduction is therefore not accompanied by further impairments to the advantages of the known power units.

At the same time, identical components as in other, previously known power units with a higher power level can be used. A component system thus results by which power units of different power levels can be produced at a favourable cost. In particular, the two-cylinder reciprocating-piston engine as base module of the component system can thus be retained identically for various power levels. This costs in series production are thereby considerably reduced.

Furthermore, a vehicle, in particular a hybrid vehicle, with a power unit according to the invention, is claimed within the scope of the invention.

The invention is explained more closely below with further details with reference to the enclosed schematic drawings. There are shown therein.

Figure 1:
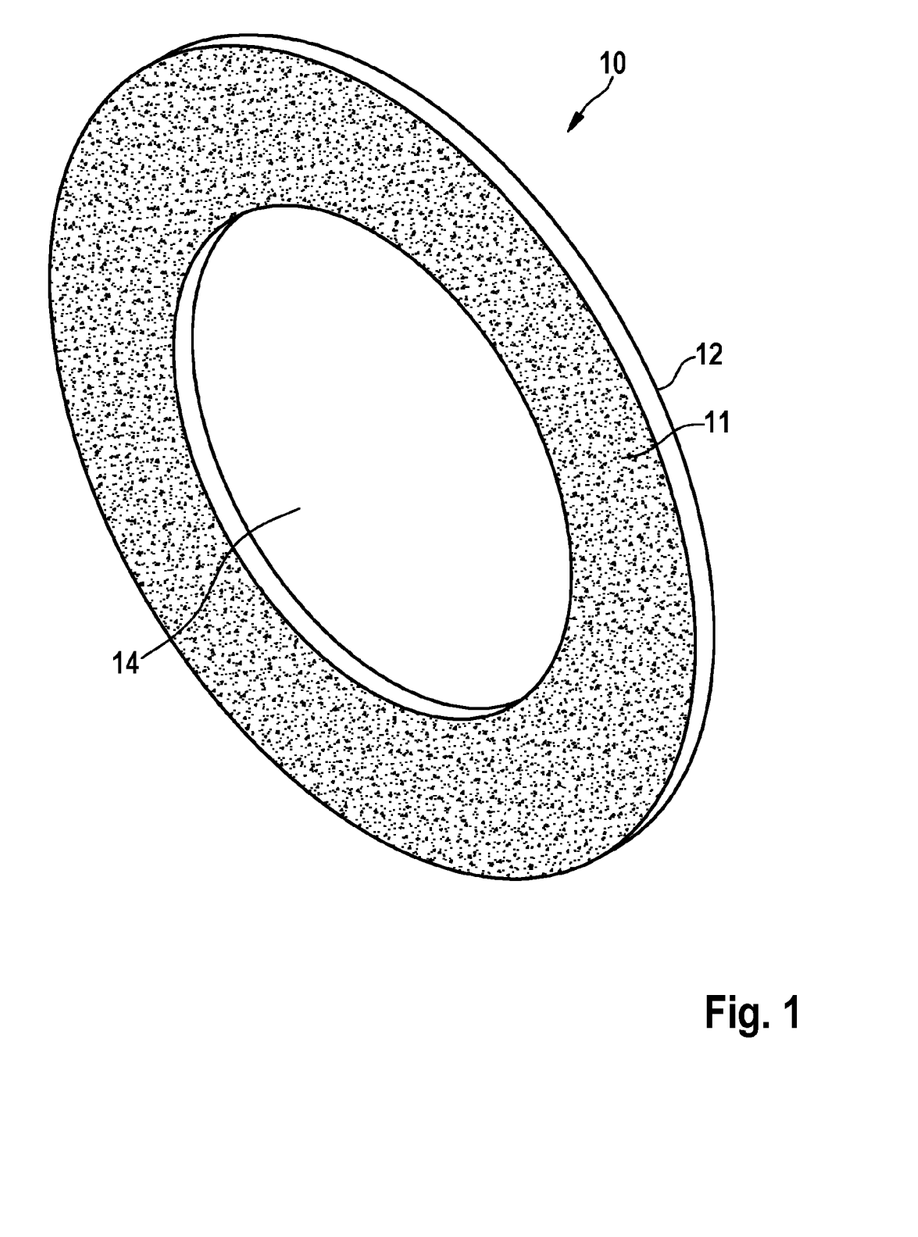
FIG. 1 a perspective view of a coated connection disc according to an example embodiment according to the invention in accordance with claim 1.

FIG. 1 shows a perspective view of a coated connection disc for a power unit according to the invention in accordance with claim 1. The connection disc 10 is embodied in a ring-shaped and flat manner. It has a right-side and left-side support surface 12. In the middle, a central opening 14 is arranged, through which a screw 20 for fastening between sprocket 21 and crankshaft 22 can extend through the connection disc 10.

Generally, the connection disc 10 can have a coating 11. The coating 11 intensifies here the frictional engagement between the hub-hub connection according to the invention.

In a preferred embodiment, the connection disc 10 has a coating 11 with hard material elements embedded therein. The connection disc 10 can be coated on a right-side or left-side support surface 12 or advantageously on both support surfaces 12. Ideally, the coating 11 has diamond chips. An increased frictional engagement is thus guaranteed. The coating 11 can cover the connection disc 10 partially or completely. The layer thickness of the coating 11 can be greater here than the thickness of the connection disc 10. Generally it applies that a thicker layer of the connection disc 10 enables an increased frictional engagement.

Figure 2:
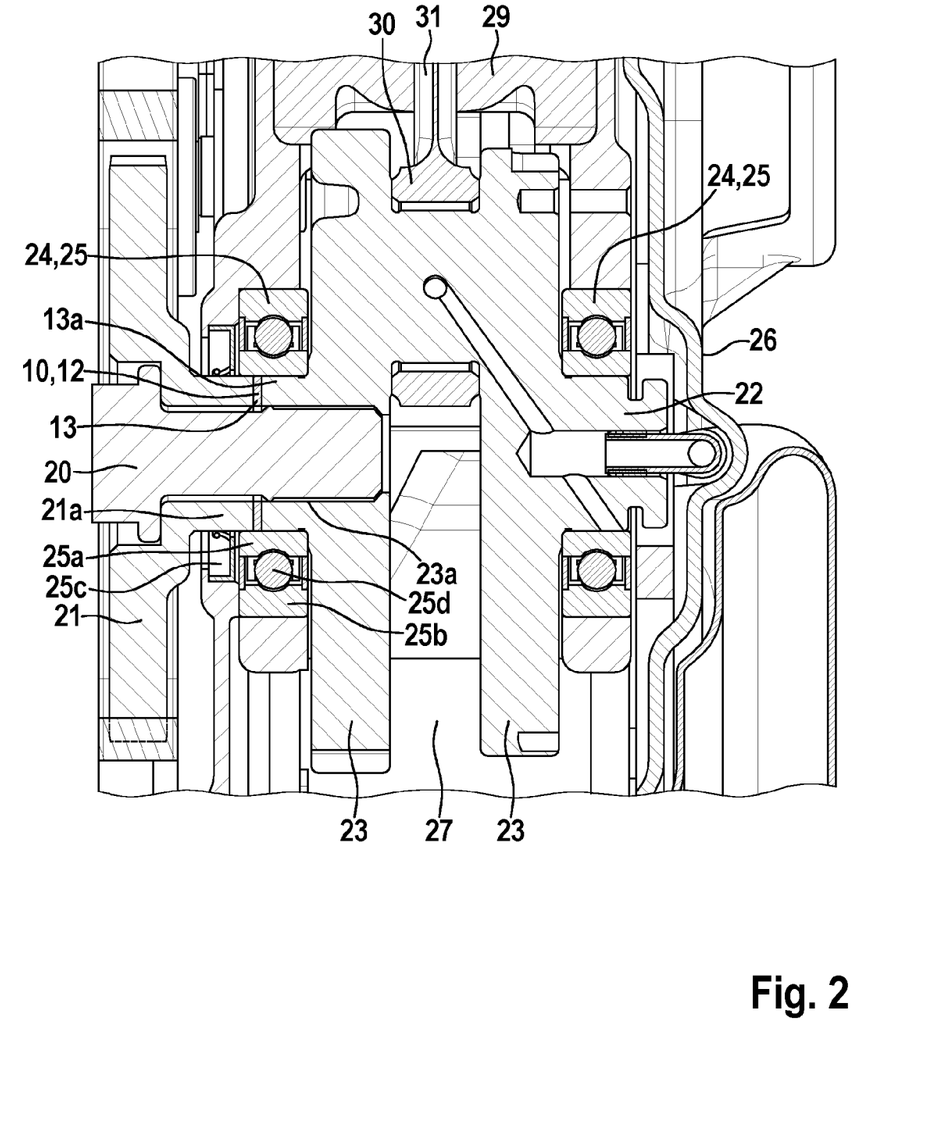
FIG. 2 a partial section through a reciprocating-piston engine for a power unit according to an example embodiment according to the invention along the rotation axis of a crankshaft.

FIG. 2 shows a partial section through a reciprocating-piston engine for a power unit according to an example embodiment according to the invention. The section runs through a cylinder 29 and through the rotation axis of a crankshaft 22. The reciprocating-piston engine has a crankshaft housing 26. A crankshaft 22 is arranged in the lower part of the crankshaft housing 26. The crankshaft 22 can be surrounded by an oil collecting region 27 beneath the crankshaft 22.

The crankshaft 22 comprises for example two crank webs 23. A crank pin 23a is arranged on the left-side crank web 23.

The left-side crank web 23 and the crank pin 23a have centrally a bore for a screw 20. A sprocket 21 is fastened to the crank web 23 in a non-rotatable and force-fitting manner by the screw 20. The sprocket 21 has a sprocket hub 21a on the side facing the crankshaft 22. The bore runs horizontally through the crank web 23 and the crank pin 23a and centrally through the sprocket 21 and the sprocket hub 21a. The screw 20, proceeding from the sprocket 21, thus opens into the crank web 23. The screw 20 thus lies in a recessed manner in the sprocket 21.

The screw thread can extend through the crank web 23 and the crank pin 23a. Furthermore, the screw thread can extend up into the sprocket hub 21a. The bore runs for example almost through the entire length of the crank web 23. The screw diameter here is preferably approximately as great as the crank pin 23a. In particular, the screw diameter can have a size which corresponds to between 50% and 80% the size of the crank pin diameter. This increases the stability of the hub-hub connection.

The screw 20 extends centrally through the connection disc 10. In particular, the screw 20 and the connection disc 10 are coaxially arranged. An axial pressure force of the screw 20 acts thereby onto the connection disc 10. The connection disc 10 has a right-side and left-side support surface 12, on which respectively a face surface 13a of the crank pin 23a and a face surface 13 of the sprocket hub 21a rest. The connection disc 10 has the same diameter as the face surface 13a of the crank pin 23a and the face surface 13 of the sprocket hub 21a.

On the crankshaft 22 several crankshaft bearings 24 are arranged, which are configured as roller bearings 25. The roller bearing 25 comprises an inner ring 25a and an outer ring 25b. A round rolling body 25d is arranged centrally between inner ring 25a and outer ring 25b. On the side of the crankshaft 22 facing the sprocket hub 21a a roller bearing 25 is arranged, which is secured by a securing element 25c. The securing element 25c is arranged between the roller bearing 25 and the sprocket 21.

The roller bearing 25 surrounds the sprocket hub 21a, the crank pin 23a and the connection disc 10.

An outer circumferential area of the connection disc 10 thus adjoins the inner ring 25a of the roller bearing 25.

The connection rod bearing 30 is arranged on the crankshaft 22 between the crank webs 23. The connection rod bearing 30 connects the crankshaft 22 with a connection rod 31. The crankshaft 22 has the task here of receiving forces which are directed via the connection rod 31, and of converting these into a torque. The torque can then be passed on to a generator 40.

The connection rod 31 is connected to a piston 44, not illustrated, which can carry out an oscillating movement in a cylinder 29 and thereby exerts pressure onto the fuel mixture which is present in the cylinder 29.

Figure 3:
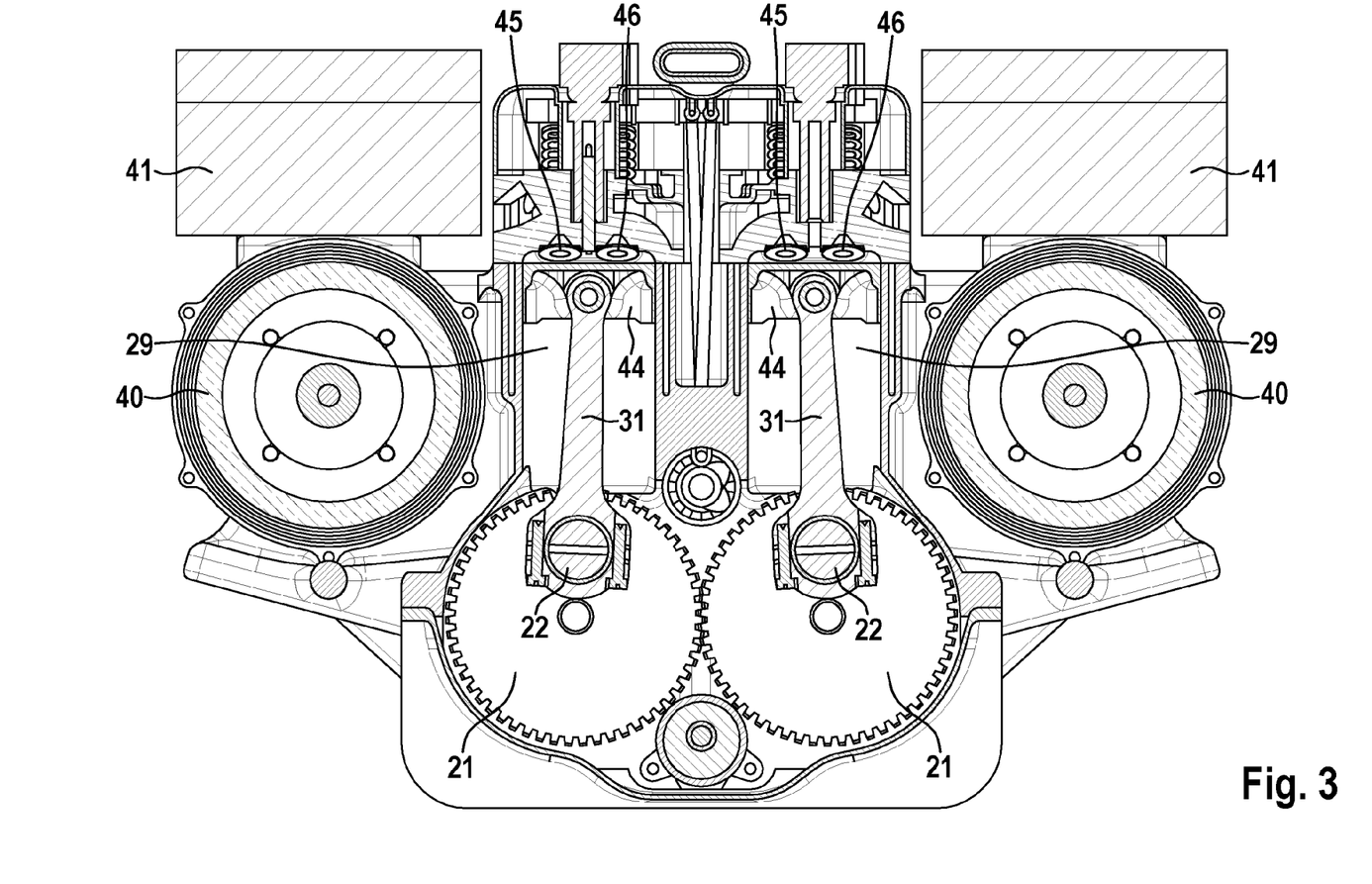
FIG. 3 a frontal section through a power unit according to an example embodiment according to the invention.

FIG. 3 represents a frontal section through a power unit according to the invention with a reciprocating-piston engine. The reciprocating-piston engine has two crankshafts and two cylinders 29 in a tandem arrangement. The cylinders 29 are arranged parallel to one another here. On the crankshafts 22 sprockets 21 are arranged, which are in engagement with one another and bring about an oppositely directed drive of the crankshafts 22 which are mechanically coupled in the same phase.

The connection rods 31 are articulatedly connected with respectively a piston 44, which is guided respectively in one of the two parallel cylinders 29. The connection rods 31 can carry out here an oscillating movement in upward and downward direction.

Above the cylinders 29, inlet and outlet valves 45, 46 are arranged which are respectively connected with an inlet and outlet channel. During the various ignition strokes of the reciprocating-piston engine, the valves are operated for example by a camshaft by means of control rods and rocker arms.

The crankshafts 22 are connected respectively by means of a traction means, not illustrated, for example a chain, a toothed chain or a toothed belt, to one of the two generators 40. Above the two generators 40 respectively a receiving space 41 for electronics is arranged. Such a power unit with a reciprocating-piston engine, and two generators 40 is advantageously able to be used as a drive unit of a hybrid vehicle. The hub-hub connection according to the invention can be arranged for example between the crankshaft and the sprocket or between a generator and a gear drivingly connected therewith.

Figure 4:
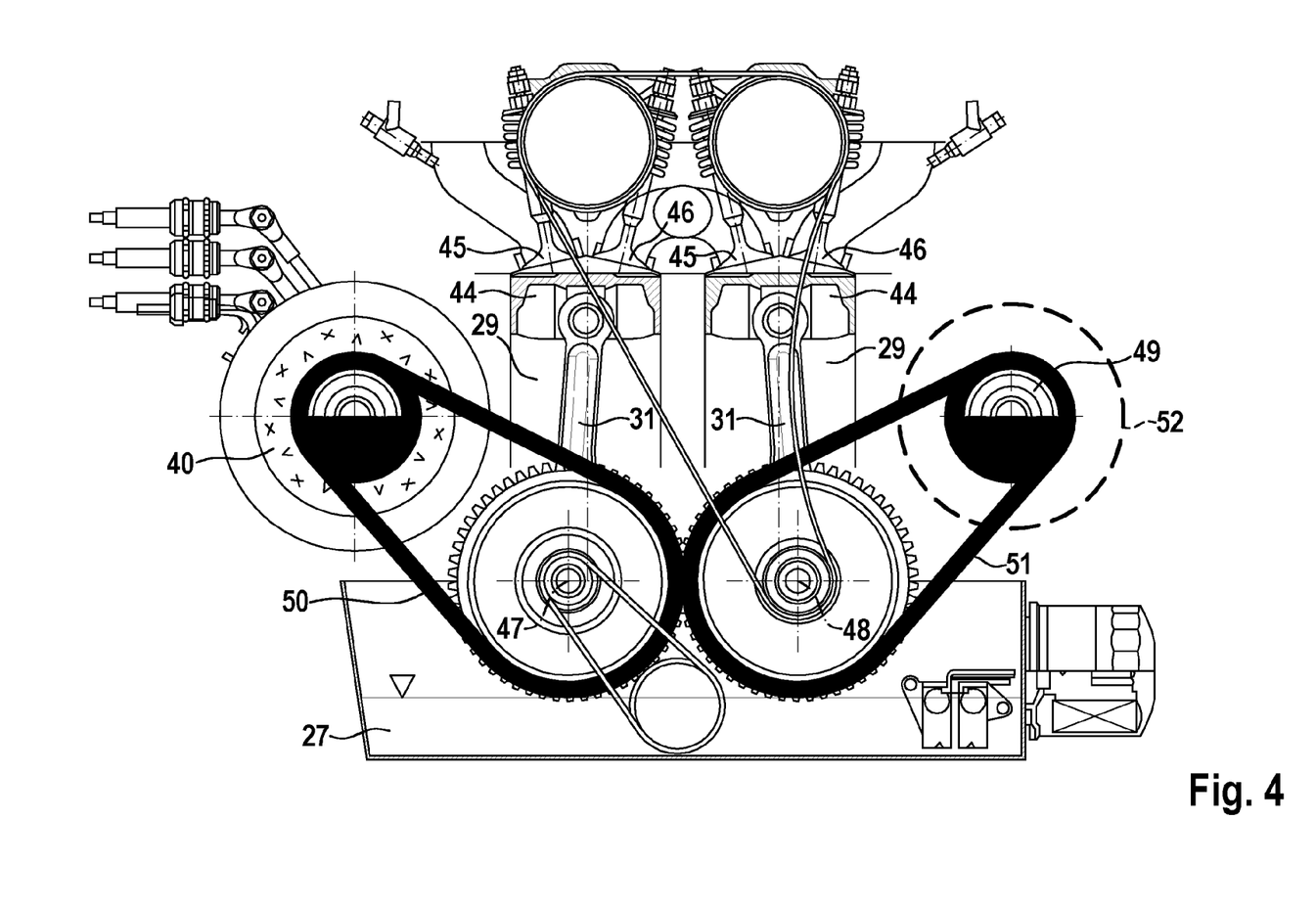
FIG. 4 a power unit according to an example embodiment according to the invention, wherein the flywheel mass element is carried by the balance shaft.

In FIG. 4 a power unit according to an example embodiment according to the invention is shown, which is formed essentially by a reciprocating-piston engine, a generator 40 and a balance shaft 49. The reciprocating-piston engine has two cylinders 29 arranged in tandem form, in particular parallel to one another. In the cylinders 29, pistons 44 are guided which are articulatedly coupled by means of connection rods 31 respectively with a crankshaft 47, 48. The crankshafts 47, 48 are rotatable in opposite directions and have respectively on the face side gears 50, 51 which engage into one another, in order to thus synchronize the movement of the pistons 44. Preferably, provision is made that the distance between the articulated connections between the connection rods 31 and the pistons 44 is smaller than the distance of the crankshaft axes with respect to one another. The cylinders 29 are therefore arranged in an inwardly offset manner with respect to the crankshafts 47, 48. This leads to the fact that in a top dead centre of the pistons, the connection rods 31 are at a slight angle with respect to the crankshaft axes, whereby the piston skirt friction reduces. This results in a particularly quiet engine start.

In the example embodiment according to FIG. 4, a flywheel mass element 52 is fastened on the balance shaft 49. In particular, the balance shaft 49 carries the flywheel mass element 52. The flywheel mass element 52 is connected to the balance shaft 49 in a non-rotatable manner. In this embodiment of the power unit on the generator 40 and the balance shaft 49, the mounted gears or respectively pulleys, which are in engagement with respective traction means 50, 51, are equipped with the same diameters. This leads to the fact that the generator 40 and the balance shaft 49 rotate with the same rotation speed, so that the rotating mass of the generator 40 and the rotating flywheel mass of the flywheel mass element 52 balance each other out. In this way, in particular, moments of mass inertia of the second order are balanced out.

Figure 5:
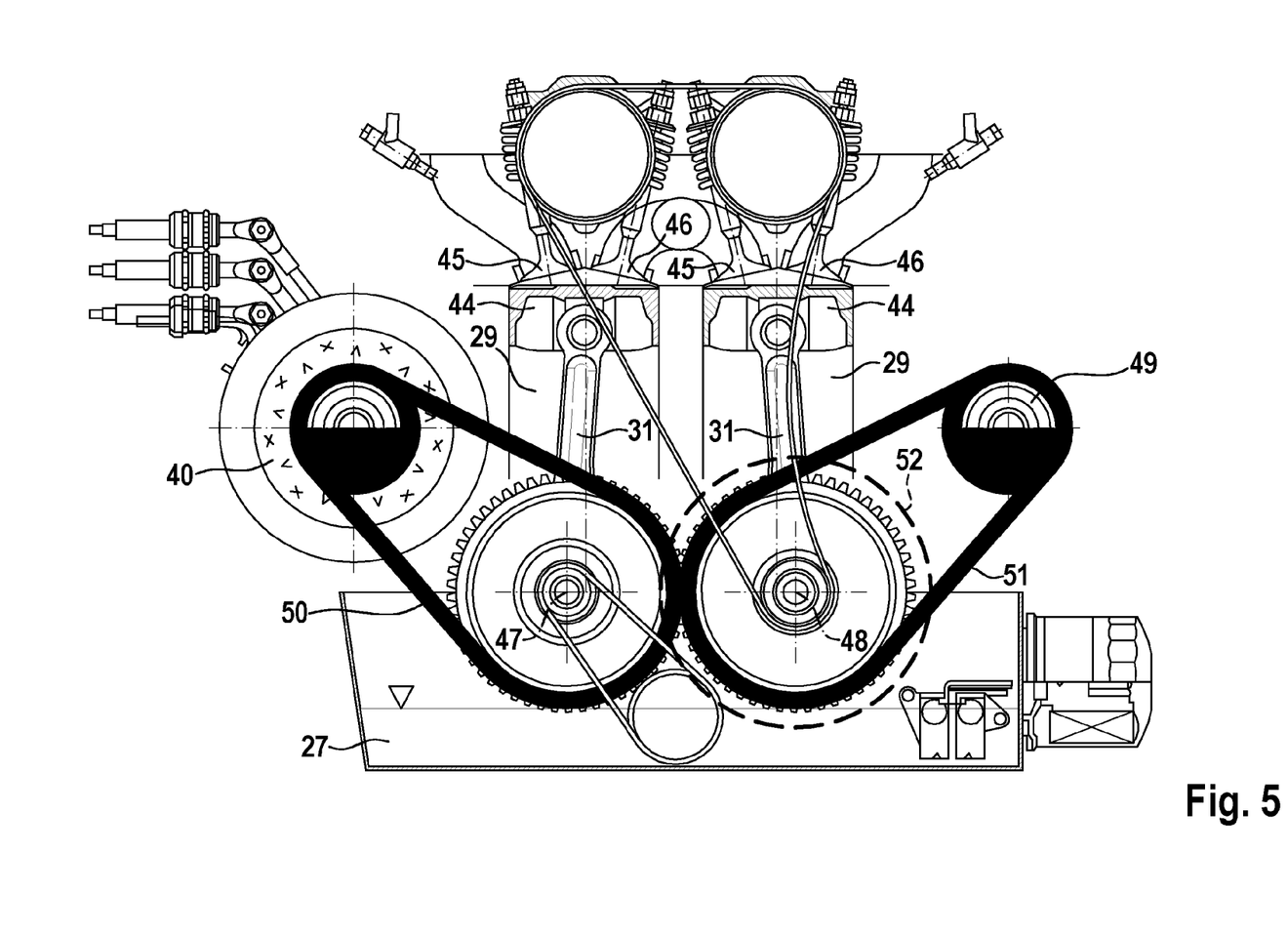
FIG. 5 a power unit according to a further example embodiment according to the invention, wherein the flywheel mass element is carried by the second crankshaft.

In the example embodiment according to FIG. 5, the flywheel mass element 52 is arranged on the second crankshaft 48. In particular, the second crankshaft 48 carries the flywheel mass element 52. However, the coupling of the flywheel mass element 52 with the second crankshaft 48 takes place preferably indirectly by means of a transmission gearing, so that the flywheel mass element 52, in operation, rotates with twice the speed with respect to the second crankshaft 48.

REFERENCE LIST 10 connection disc
11 coating
12 support surface
13 face surface sprocket hub
13*a* face surface crank pin
14 opening
20 screw
21 sprocket
21*a* sprocket hub
22 crankshaft
23 crank web
23*a* crank pin
24 crankshaft bearing
25 roller bearing
25*a* inner ring
25*b* outer ring
25*c* securing element
25*d* rolling body
26 crankshaft housing
27 oil collecting region
29 cylinder
30 connection rod bearing
31 connection rod
40 generator
41 receiving space
44 piston
45 inlet valve
46 outlet valve
47 first crankshaft
48 second crankshaft
49 balance shaft
50 first traction means
51 second traction means
52 flywheel mass element

The invention claimed is:

1. A power unit comprising:
a reciprocating-piston engine (engine) having at least one generator drivingly connected to the engine, the engine including a first hub coupled to a second hub by a first connection;
at least two pistons included in the engine guided in at least two cylinders arranged in tandem;
first and second crankshafts connected to the pistons by connection rods running in opposite directions and mechanically coupled in a same phase; and
a connection disk configured, dimensioned and arranged as a second connection for transmitting torque from the first hub to the second hub such that an angular position between the hubs is continuously adjustable on installation, wherein the first hub and the second hub rest on each of a plurality of surfaces of the connection disk, and wherein the surfaces of the connection disk include a matrix of hard materials for frictional engagement of the hubs.

2. The power unit of claim 1, wherein the frictional engagement is by one of a screw screwed into an inner thread of the first hub or a hub nut screwed with an outer thread of the first hub.

3. The power unit of claim 2, wherein the one of the screw or the hub nut pass through the connection disk.

4. The power unit of claim 2, wherein the one of the screw or the hub nut exert force in a longitudinal direction against the connection disk.

5. The power unit of claim 2, wherein the screw is tightened in a direction against the transmission of torque from the first hub to the second hub.

6. The power unit of claim 1, wherein the first hub and the second hub form parallel facing surfaces resting on the connection disk.

7. The power unit of claim 1, wherein the first hub includes at least one of the crankshafts and the second hub includes one of a sprocket or a belt wheel.

8. The power unit of claim 1, wherein the at least one generator is connected to an output hub of the engine by one of a gearwheel mechanism or a traction mechanism.

9. The power unit of claim 8, wherein the traction mechanism is one of a toothed chain or a toothed belt.

10. The power unit according to claim 8, wherein the first crankshaft rotates in a first direction and the second crankshaft rotates in a second direction opposite the first direction, wherein the at least one generator is rotatable in the first direction, wherein a balance shaft is rotatable in the second direction and is drivingly connected with the second crankshaft, and wherein a flywheel mass is carried by one of the balance shaft or the second crankshaft.

11. A power unit comprising:
a reciprocating-piston engine (engine) having at least one generator drivingly connected to the engine, the engine including a first hub coupled to a second hub by a first connection;
at least two pistons included in the engine guided in at least two cylinders arranged in tandem;
first and second crankshafts connected to the pistons by connection rods running in opposite directions and mechanically coupled in a same phase; and
a connection disk configured, dimensioned and arranged as a second connection for transmitting torque from the first hub to the second hub such that an angular position between the hubs is continuously adjustable on installation, wherein the first hub and the second hub rest on each of a plurality of surfaces of the connection disk, and wherein the surfaces of the connection disk include a matrix of hard materials for frictional engagement of the hubs, wherein the frictional engagement is by one of a screw screwed into an inner thread of the first hub or a hub nut screwed with an outer thread of the first hub.

12. The power unit of claim 11, wherein the one of the screw or the hub nut pass through the connection disk.

13. The power unit of claim 11, wherein the one of the screw or the hub nut exert force in a longitudinal direction against the connection disk.

14. The power unit of claim 11, wherein the screw is tightened in a direction against the transmission of torque from the first hub to the second hub.

15. The power unit of claim 11, wherein the first hub and the second hub form parallel facing surfaces resting on the connection disk.

16. The power unit of claim 11, wherein the first hub includes at least one of the crankshafts and the second hub is an output hub having one of a sprocket or a belt wheel.

17. The power unit of claim 16, wherein the at least one generator is connected to the output hub by one of a gearwheel mechanism or a traction mechanism.

18. The power unit of claim 17, wherein the traction mechanism is one of a toothed chain or a toothed belt.

19. A power unit comprising:
- a reciprocating-piston engine (engine) having first and second generators connected to the engine via first and second crankshafts respectively, the engine including at least two pistons guided in at least two cylinders arranged in tandem, the crankshafts connected to the pistons by connection rods running in opposite directions and mechanically coupled in a same phase;
- a first hub coupled to a second hub included in the engine by a first connection; and
- a connection disk configured, dimensioned and arranged as a second connection for transmitting torque from the first hub to the second hub such that an angular position between the hubs is continuously adjustable on installation, wherein the first hub and the second hub rest on each of a plurality of surfaces of the connection disk, and wherein the surfaces of the connection disk include a matrix of hard materials for frictional engagement of the hubs.

* * * * *